UNITED STATES PATENT OFFICE.

J. PHELPS DAVIS, OF MIDDLETOWN, CONNECTICUT.

ARTIFICIAL STONE.

SPECIFICATION forming part of Letters Patent No. 224,660, dated February 17, 1880.

Application filed July 29, 1879.

*To all whom it may concern:*

Be it known that I, J. PHELPS DAVIS, of Middletown, in the county of Middlesex, and in the State of Connecticut, have invented certain new and useful Improvements in Artificial Stone; and I do hereby declare that the following is a full, clear, and exact description thereof, reference being had to the accompanying drawings, and to the letters of reference marked thereon, making a part of this specification.

My invention relates to artificial stone; and it consists in a compound or composition for the same, as well as the peculiar method or process for making the same, as will be hereinafter more fully set forth.

The stone is composed, principally, of the following ingredients, viz: twenty quarts of sand, emery, or powdered stone; one and one-half pound of asphaltum; one-half pound powdered mineral salt; one quart rye-flour. These ingredients are well mixed together. Then to one gallon of water I add three gills of molasses, and with this solution I temper the mass to such a consistency that it can be pressed into molds, after which it is baked in a kiln until perfectly dry and of sufficient hardness to be taken out. The stone is then immersed in linseed-oil and put back in the kiln to bake from three to twelve hours, according to size. It is then taken out and a second time immersed in oil, and again rebaked, which completes the process.

I do not confine myself to the exact proportions of the ingredients, as they may be varied under different circumstances.

Having thus fully described my invention, what I claim as new, and desire to secure by Letters Patent, is—

1. The compound for artificial stone, consisting of sand, or its equivalent, asphaltum, salt, and rye-flour, substantially as set forth.

2. As a new article of manufacture, artificial stone immersed in oil and baked, substantially as set forth.

3. The process for manufacturing artificial stone, consisting, essentially, in molding and baking the same, then immersing in oil and rebaking one or more times, substantially as herein set forth.

In testimony that I claim the foregoing I have hereunto set my hand this 19th day of June, 1879.

J. PHELPS DAVIS.

Witnesses:
ARTHUR B. CALEF,
J. FRANCIS CALEF.